US007207494B2

(12) United States Patent
Theodossiou et al.

(10) Patent No.: US 7,207,494 B2
(45) Date of Patent: Apr. 24, 2007

(54) LASER ETCHED SECURITY FEATURES FOR IDENTIFICATION DOCUMENTS AND METHODS OF MAKING SAME

(75) Inventors: George Theodossiou, Brockton, MA (US); Robert Jones, Andover, MA (US)

(73) Assignee: Digimarc Corporation, Beaverton, OR (US)

( * ) Notice: Subject to any disclaimer, the term of this patent is extended or adjusted under 35 U.S.C. 154(b) by 136 days.

(21) Appl. No.: 10/330,033

(22) Filed: Dec. 24, 2002

(65) Prior Publication Data

US 2004/0011874 A1 Jan. 22, 2004

Related U.S. Application Data

(60) Provisional application No. 60/344,716, filed on Dec. 24, 2001.

(51) Int. Cl.
*G06K 19/00* (2006.01)

(52) U.S. Cl. ........................ 235/487; 235/494; 235/491

(58) Field of Classification Search ................ 235/487, 235/488, 486
See application file for complete search history.

(56) References Cited

U.S. PATENT DOCUMENTS 3,153,166 A 10/1964 Thornton, Jr. et al.
3,582,439 A 6/1971 Thomas ......................... 161/5
3,614,839 A 10/1971 Thomas ......................... 40/2.2
3,758,970 A 9/1973 Annenberg
3,860,558 A 1/1975 Klemchuk
3,975,291 A 8/1976 Claussen et al.
4,035,740 A 7/1977 Schafer et al.
4,051,374 A 9/1977 Drexhage et al.
4,072,911 A 2/1978 Walther et al.
4,100,509 A 7/1978 Walther et al.
4,131,337 A 12/1978 Moraw et al.
4,171,766 A 10/1979 Ruell
4,256,900 A 3/1981 Raue
4,271,395 A 6/1981 Brinkmann et al.
4,274,062 A 6/1981 Brinkmann et al.
4,289,957 A 9/1981 Neyroud et al.
4,301,091 A 11/1981 Schieder al.
4,313,984 A 2/1982 Moraw et al. ................ 428/13
4,317,782 A 3/1982 Eckstein et al.

(Continued)

FOREIGN PATENT DOCUMENTS

EP 1909971 B1 8/1986

(Continued)

OTHER PUBLICATIONS

PCT—Notification of Transmittal of the International Search Report or the Declaration and International Search Report for International Application No. PCT/US02/41691, mailed on Jun. 5, 2003.

(Continued)

*Primary Examiner*—Karl D. Frech

(57) ABSTRACT

The invention provides a method of producing a security feature in an identification document. A core including a top surface and a bottom surface is provided. A first laminate is laminated in contact with the top surface. A second laminate is laminated in contact with the bottom surface, the laminated core comprising the identification document, the identification document having a top side and a bottom side respectively corresponding to the core's top and bottom side. A pattern is laser etched into the top surface of the identification document.

20 Claims, 5 Drawing Sheets

62

U.S. PATENT DOCUMENTS 4,326,066 A 4/1982 Eckstein et al.
4,338,258 A 7/1982 Brinkwerth et al.
4,384,973 A 5/1983 Harnisch
4,467,209 A 8/1984 Maurer et al.
4,468,468 A 8/1984 Benninghoven et al.
4,507,346 A 3/1985 Maurer et al.
4,510,311 A 4/1985 Eckstein
4,523,777 A 6/1985 Holbein et al.
4,527,059 A 7/1985 Benninghoven et al.
4,544,181 A 10/1985 Maurer et al.
4,551,265 A 11/1985 Brinkwerth et al.
4,579,754 A * 4/1986 Maurer et al. ................ 428/29
4,596,409 A 6/1986 Holbein et al.
4,597,592 A 7/1986 Maurer et al.
4,597,593 A 7/1986 Maurer
4,621,271 A 11/1986 Brownstein
4,629,215 A 12/1986 Maurer et al.
4,653,775 A 3/1987 Raphael et al.
4,654,290 A 3/1987 Spanjer
4,663,518 A 5/1987 Borror et al.
4,670,882 A 6/1987 Telle et al.
4,672,891 A 6/1987 Maurer et al.
4,675,746 A 6/1987 Tetrick et al.
4,687,526 A 8/1987 Wilfert
4,711,690 A 12/1987 Haghiri-Tehrani ....... 156/309.6
4,732,410 A 3/1988 Holbein et al. ............... 203/67
4,735,670 A 4/1988 Maurer et al.
4,738,949 A 4/1988 Sethi et al.
4,748,452 A 5/1988 Maurer
4,751,525 A 6/1988 Robinson
4,754,128 A * 6/1988 Takeda et al. .............. 235/488
4,765,656 A 8/1988 Becker et al.
4,766,026 A 8/1988 Lass et al.
4,803,114 A 2/1989 Schledorn
4,816,372 A 3/1989 Schenk et al.
4,816,374 A 3/1989 Lecomte
4,822,973 A 4/1989 Fahner et al.
4,894,110 A 1/1990 Lass et al.
4,959,406 A 9/1990 Foltin et al.
4,968,063 A 11/1990 McConville et al. ......... 283/72
4,999,065 A 3/1991 Wilfert
5,005,872 A 4/1991 Lass et al. .................... 283/85
5,024,989 A 6/1991 Chiang et al.
5,060,981 A 10/1991 Fossum et al. ............. 283/109
5,061,341 A 10/1991 Kildal et al.
5,100,711 A 3/1992 Satake et al. ................. 428/64
5,122,813 A 6/1992 Lass et al.
5,138,070 A 8/1992 Berneth
5,138,604 A * 8/1992 Umeda et al. .............. 369/103
5,156,938 A 10/1992 Foley et al.
5,157,424 A 10/1992 Craven et al.
5,169,707 A 12/1992 Faykish et al. ............. 428/195
5,215,864 A 6/1993 Laakmann
5,216,543 A 6/1993 Calhoun ..................... 359/619
5,261,987 A 11/1993 Luening et al.
5,294,774 A 3/1994 Stone .................... 219/121.77
5,298,922 A 3/1994 Merkle et al. ............... 346/1.1
5,337,361 A 8/1994 Wang et al.
5,421,619 A 6/1995 Dyball
5,449,200 A 9/1995 Andric et al. ................. 283/67
5,474,875 A 12/1995 Loerzer et al.
5,489,639 A 2/1996 Faber et al.
5,509,693 A 4/1996 Kohls
5,523,125 A 6/1996 Kennedy et al.
5,529,345 A 6/1996 Kohls
5,550,346 A 8/1996 Andriash et al. ...... 219/121.72
5,576,377 A 11/1996 El Sayed et al.
5,633,119 A 5/1997 Burberry et al.
5,639,819 A 6/1997 Farkas et al.
5,671,005 A 9/1997 McNay et al.
5,698,296 A 12/1997 Dotson
5,717,018 A 2/1998 Magerstedt et al.
5,719,667 A 2/1998 Miers
5,745,308 A 4/1998 Spangenberg
5,768,001 A 6/1998 Kelley et al.
5,769,301 A 6/1998 Hebert et al.
5,795,643 A 8/1998 Steininger et al.
5,801,857 A 9/1998 Heckenkamp et al.
5,815,292 A * 9/1998 Walters ......................... 359/2
5,816,619 A 10/1998 Schaede
5,824,715 A 10/1998 Hayashihara et al.
5,840,791 A 11/1998 Magerstedt et al.
5,841,886 A 11/1998 Rhoads
5,844,685 A 12/1998 Gontin
5,853,955 A 12/1998 Towfiq
5,855,969 A 1/1999 Robertson
5,866,644 A 2/1999 Mercx et al.
5,867,199 A 2/1999 Knox et al.
5,872,627 A 2/1999 Miers
5,895,074 A 4/1999 Chess et al.
5,936,986 A 8/1999 Cantatore et al.
5,944,356 A 8/1999 Bergmann et al.
5,958,528 A 9/1999 Bernecker
5,965,242 A 10/1999 Patton et al.
5,973,842 A 10/1999 Spangenberg
5,975,583 A 11/1999 Cobben et al. ............... 283/93
5,977,514 A 11/1999 Feng et al. ............ 219/121.69
6,007,929 A 12/1999 Robertson et al.
6,017,972 A 1/2000 Harris et al.
6,022,905 A 2/2000 Harris et al.
6,028,134 A 2/2000 Zhang et al.
6,036,807 A 3/2000 Brongers
6,037,102 A 3/2000 Loerzer et al.
6,042,249 A 3/2000 Spangenberg
6,054,170 A 4/2000 Chess et al.
6,066,594 A 5/2000 Gunn et al.
6,075,223 A 6/2000 Harrison
6,086,971 A 7/2000 Haas et al.
6,110,864 A 8/2000 Lu
6,122,403 A 9/2000 Rhoads
6,127,475 A 10/2000 Vollenberg et al.
6,143,852 A 11/2000 Harrison et al.
6,179,338 B1 1/2001 Bergmann et al.
6,207,344 B1 3/2001 Ramlow et al.
6,214,916 B1 4/2001 Mercx et al.
6,214,917 B1 4/2001 Linzmeier et al.
6,221,552 B1 4/2001 Street et al.
6,238,840 B1 5/2001 Hirayama et al.
6,291,551 B1 9/2001 Kniess et al.
6,302,444 B1 10/2001 Cobben ....................... 283/72
6,313,436 B1 11/2001 Harrison
6,326,128 B1 12/2001 Telser et al.
6,372,394 B1 4/2002 Zientek
6,400,386 B1 6/2002 No et al.
6,413,687 B1 7/2002 Hattori et al.
6,444,068 B1 9/2002 Koops et al.
6,446,865 B1 * 9/2002 Holt et al. .................. 235/382
6,475,588 B1 11/2002 Schottland et al.
6,614,914 B1 9/2003 Rhoads et al.
6,712,397 B1 3/2004 Mayer et al.
6,752,432 B1 6/2004 Richardson
6,794,115 B2 9/2004 Telser et al.
6,954,293 B2 10/2005 Heckenkamp et al.
2002/0018430 A1 2/2002 Heckenkamp et al.
2002/0146549 A1 10/2002 Kranenburg-Van Dijk et al.
2003/0117262 A1 6/2003 Anderegg et al.
2003/0141358 A1 7/2003 Hudson et al.
2003/0178487 A1 9/2003 Rogers
2003/0178495 A1 9/2003 Jones et al.
2003/0234286 A1 12/2003 Labrec et al.
2004/0076310 A1 4/2004 Hersch et al.

2004/0245346 A1 12/2004 Haddock

FOREIGN PATENT DOCUMENTS

| | | |
|---|---|---|
| EP | 697433 | 2/1996 |
| GB | 1088318 | 10/1967 |
| GB | 2132136 | 7/1984 |
| GB | 2240948 | 8/1991 |
| WO | WO 91/16722 | 10/1991 |
| WO | WO97/01446 | 1/1997 |
| WO | WO98/19869 | 5/1998 |
| WO | WO 00/43215 | 7/2000 |
| WO | WO00/43216 | 7/2000 |
| WO | WO/00/45344 | 8/2000 |
| WO | WO 00/78554 | 12/2000 |
| WO | WO 01/00719 | 1/2001 |
| WO | WO 01/45559 | 6/2001 |
| WO | WO 02/42371 | 5/2002 |
| WO | WO03/055684 | 7/2003 |

OTHER PUBLICATIONS

PCT—Notification of Transmittal of the International Search Report or the Declaration and International Search Report for International Application No. PCT/US02/41644, mailed on May 30, 2003.

* cited by examiner

PRIOR ART (A)

LASER ETCHED SECURITY FEATURES FOR IDENTIFICATION DOCUMENTS AND METHODS OF MAKING SAME

RELATED APPLICATION DATA

This application claims priority to provisional patent application 60/344,716, the contents of which are incorporated herein by reference.

This application is related to the following U.S. provisional patent applications, which were filed Dec. 24, 2001:

- Sensitizing Materials For Laser Engraving (Application No. 60/344,677, Inventor: Brian LaBrec);
- Full Color Laser Engraved System For Identification Card Imaging (Application No. 60/344,674, Inventor: Robert Jones);
- Reducing Cracking In Identification Documents (application No. 60/344,710, Inventors: Robert Jones and Lori Shah);
- An Inkjet Receiver On Teslin Sheet (Application No. 60/344,685, Inventors: Daoshen Bi and Drank Dai);
- Laser Engraving Coating System (Application No. 60/344,675, Inventor: Brain LaBrec);
- Forming Variable Information In Identification Documents By Laser Ablation (Application No. 60/344,676, Inventor: Brian LaBrec);
- Laser Etched Security Feature (Application No. 60/344,716, Inventors: George Theodossiou and Robert Jones);
- Manufacture Of Contact Smart Cards (Application No. 60/344,717, Inventors: Thomas Regan and Robert Jones);
- Manufacture Of Contact-Less Smart Cards (Application No. 60/344,719, Inventors: Daoshen Bi, Robert Jones and John Lincoln);
- Manufacture Of An All-Pet Identification Document (Application No. 60/344,673, Inventors: Thomas Regan and Robert Jones);
- Tamper Evident Coating To Combat Heat Intrusion (Application No. 60/344,709, Inventor: Brian LaBrec);
- Pressure Sensitive UV Curable Adhesive Composition (Application No. 60/344,753, Inventor: William Rice);
- Heat Activated UV Curable Adhesive Composition (Application No. 60/344,688, Inventor: William Rice);
- Security Ink With Cohesive Failure (Application No. 60/344,698, Inventor: Bentley Bloomberg);
- Variable Based Identification Documents With Security Features (Application No. 60/344,686, Inventors: Robert Jones and Daoshen Bi);
- Multiple Image Feature For Identification Document (Application No. 60/344,718, Inventor: Brian LaBrec);
- Biometric Identification System (Application No. 60/344,682, Inventor: Thomas Lopolito);
- Identification Document Using Polasecure In Differing Colors (Application No. 60/344,687, Inventors: Bentley Bloomberg and Robert Jones); and
- Secure Id Card With Multiple Images and Method of Making (Application No. 60/344,683, Inventors: Brian LaBrec).

The present invention is also related to the following provisional applications:

- Identification Document and Related Methods (Application No. 60/421,254, Geoff Rhoads, et al);
- Identification Document and Related Methods (Application No. 60/418,762, Geoff Rhoads, et al);

- Image Processing Techniques for Printing Identification Cards and Documents (Application No. 60/371,335, Inventors: Nelson T. Schneck and Charles R. Duggan);
- Shadow Reduction System and Related Techniques for Digital Image Capture (Application No. 60/410,544, Inventors: Scott D. Haigh and Tuan A. Hoang);
- Systems and Methods for Recognition of Individuals Using Combination of Biometric Techniques (Application No. 60/418,129, Inventors James Howard And Francis Frazier, filed Oct. 11, 2002);
- Methods of Providing Optical Variable Device for Identification Documents (Application Ser. No. 60/429,115, Inventors Jones et al.)
- Systems and Methods for Managing and Detecting Fraud in Image Databases Used with Identification Documents (Application No. 60/429,501, Inventors James Howard and Francis Frazier, filed Nov. 26, 2002);
- Identification Card Printed with Jet Inks and Systems and Methods of Making Same (Application No. 10/289962, Inventors Robert Jones, Doashen Bi, and Dennis Mailloux, filed Nov. 6, 2002);

The present invention is also related to U.S. Pat. application Ser. Nos. 09/747,735Dec. 22, 2000, and Ser. No. 09/602,313, filed Jun. 23, 2000, Ser. No. 10/094,593, filed Mar. 6, 2002, U.S. Provisional Patent application No. 60/358,321, filed Feb. 19, 2002, as well as U.S. Pat. No. 6,066,594.

Each of the above U.S. patent documents is herein incorporated by reference.

PRIORITY

This application claims the priority of the following United States Provisional Applications, the contents of which are incorporated herein by reference in their entirety:

- Laser Etched Security Feature (application Ser. No. 60/344,716, Inventors George Theodossiou and Robert Jones);

TECHNICAL FIELD

The invention is generally related to identification documents, and in particular, is related to laser engraving security features onto such identification documents.

BACKGROUND

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an automated teller machine (ATM), debit an account, or make a payment, etc.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

FIGS. 1 and 2 illustrate a front view and cross-sectional view (taken along the A—A line), respectively, of an exemplary prior art identification (ID) document 10. In FIG. 1, the prior art ID document 1 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint). Although not illustrated in FIG. 1, the ID document 10 can include a magnetic stripe (which, for example, can be on the rear side (not shown) of the ID document 10), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a pre-printed core 20 (also referred to as a substrate). In many applications, the core can be a light-colored, opaque material, such as, for example, white polyvinyl chloride (PVC) material that is, for example, about 25 mil thick. The core 20 is laminated with a transparent material, such as clear PVC material 22, which, by way of example, can be about 1–5 mil thick. The composite of the core 20 and clear PVC material 22 form a so-called "card blank" 25 that can be up to about 30 mils thick. Information 26*a–c* is printed on the card blank 25 using a method such as Dye Diffusion Thermal Transfer ("D2T2") printing (described further below and also in commonly assigned U.S. Pat. No. 6,066,594, which is incorporated hereto by reference in its entirety.) The information 26*a–c* can, for example, comprise an indicium or indicia, such as the invariant or nonvarying information common to a large number of identification documents, for example the name and logo of the organization issuing the documents. The information 26*a–c* may be formed by any known process capable of forming the indicium on the specific core material used.

To protect the information 26*a–c* that is printed, an additional layer of overlaminate 24 can be coupled to the card blank 25 and printing 26*a–c* using, for example, 1 mil of adhesive (not shown). The overlaminate 24 can be substantially transparent. Materials suitable for forming such protective layers are known to those skilled in the art of making identification documents and any of the conventional materials may be used provided they have sufficient transparency. Examples of usable materials for overlaminates include biaxially oriented polyester or other optically clear durable plastic film.

The above-described printing techniques are not the only methods for printing information on data carriers such as ID documents. Laser beams, for example can be used for marking, writing, bar coding, etching, and engraving many different types of materials, including plastics. Lasers have been used, for example, to mark plastic materials to create indicia such as bar codes, date codes, part numbers, batch codes, and company logos. Lasers also have been used to engrave or etch very fine patterns into articles that are extremely difficult to replicates.

It will be appreciated that laser engraving or marking generally involves a process of inscribing or engraving a document surface with identification marks, characters, text, tactile marks—including text, patterns, designs (such as decorative or security features), photographs, etc. Some types of thermoplastics, such as polyvinylchloride (PVC), acrylonitrile butadiene styrene (ABS), and polyethylene terephthalate (PET), are capable of absorbing laser energy in their native states. Some materials which are transparent to laser energy in their native state, such as polyethylene, may require the addition of one or more additives to be responsive to laser energy.

For additional background, various laser marking and/or engraving techniques are disclosed, e.g., in U.S. Pat. Nos. 6,022,905, 5,298,922, 5,294,774, 5,215,864 and 4,732,410. Each of these patents is herein incorporated by reference. In addition, U.S. Pat. Nos. 4,816,372, 4,894,110, 5,005,872, 5,977,514, and 6,179,338 describe various implementations for using a laser to print information, and these patents are incorporated herein in their entirety.

SUMMARY

Using laser beams to write or engrave information to ID cards presents a number of advantages over conventional printing. For example, the foaming of the thermoplastic that can occur with some types of laser engraving can be adapted to provide an indicium having a tactile feel, which is a useful authenticator of a data carrier that also can be very difficult to counterfeit or alter. In addition, laser engraving generally does not require the use of ink, which can reduce the cost of consumables used to manufacture an ID card. Laser engraving can also be more durable than ink printing, and more resistant to abrasion (which can be particularly useful if a counterfeiter attempts to "rub off" an indicium on an ID card). The resolution and print quality of laser engraving often can be higher than that of conventional ink-based printing. Laser engraving also can be a more environmentally friendly manufacturing process than printing with ink, especially because solvents and other chemicals often used with ink generally are not used with laser engraving.

The foregoing and other features and advantages of the present invention will be even more readily apparent from the following Detailed Description, which proceeds with reference to the accompanying drawings.

BRIEF DESCRIPTION OF THE DRAWINGS

The advantages, features, and aspects of embodiments of the invention will be more fully understood in conjunction with the following detailed description and accompanying drawings, wherein.

Figure 1:
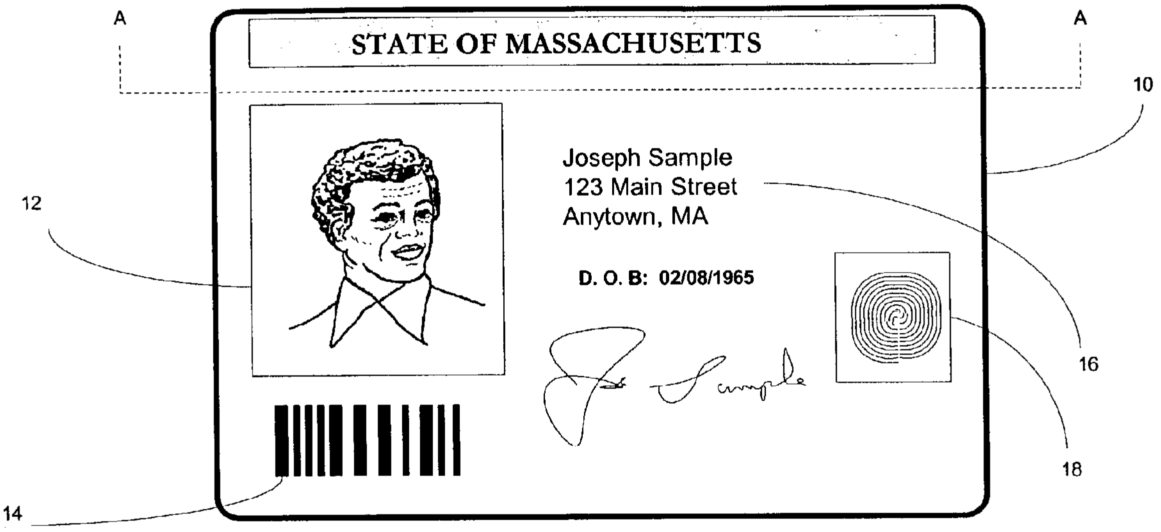
FIGURE 1 PRIOR ART
FIG. 1 is an illustrative example of a prior art identification document.
Figure 2:
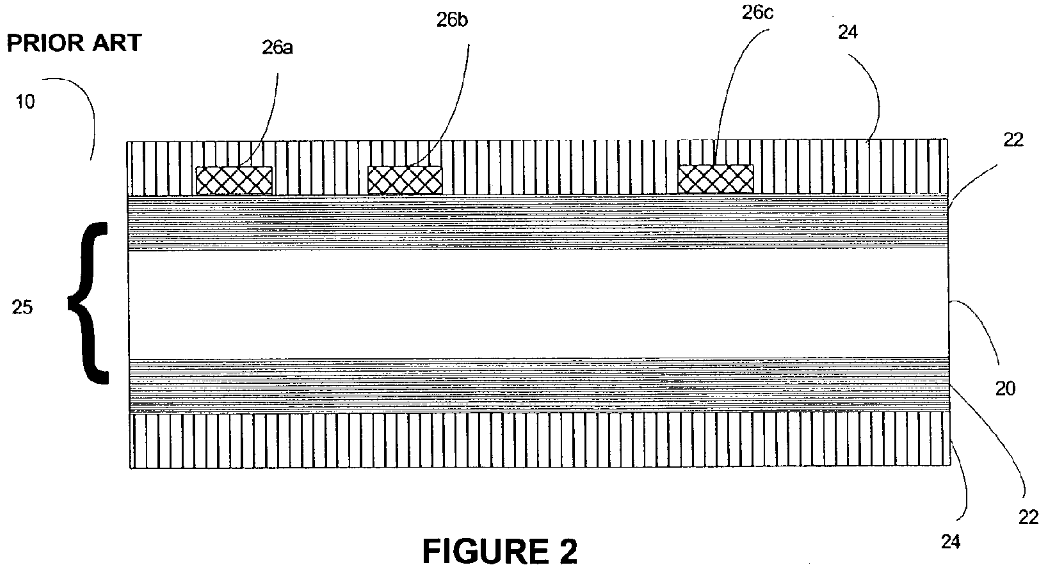
FIG. 2 is an illustrative cross section of the prior art identification document of FIG. 1, taken along the A—A line.

The drawings are not necessarily to scale, emphasis instead generally being placed upon illustrating the principles of the invention. In addition, in the figures, like numbers refer to like elements. Further, throughout this application, laser engraved indicia, information, identification documents, data, etc., may be shown as having a particular cross sectional shape (e.g., rectangular) but that is provided by way of example and illustration only and is not limiting, nor is the shape intended necessarily to represent the actual resultant cross sectional shape that occurs during laser engraving or manufacturing of identification documents.

DETAILED DESCRIPTION

A. Introduction and Definitions

In the foregoing discussion, the use of the word "ID document" is broadly defined and intended to include at least all types of ID documents, including (but are not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards and badges, certificates, identification cards or documents, voter registration and/or identification cards, police ID cards, border crossing cards, security clearance badges and cards, gun permits, badges, gift certificates or cards, membership cards or badges, tags, CD's, consumer products, knobs, keyboards, electronic components, etc., or any other suitable items or articles that may record information, images, and/or other data, which may be associated with a function and/or an object or other entity to be identified.

Note that, for the purposes of this disclosure, the terms "document," "card," "badge" and "documentation" are used interchangeably.

In addition, in the foregoing discussion, "identification" includes (but is not limited to) information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including engraving of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are printed at the time of card personalization. Personalized data can, for example, be "personal to" or "specific to" a specific cardholder or group of cardholders. Personalized data can include data that is unique to a specific cardholder (such as biometric information, image information), but is not limited to unique data. Personalized data can include some data, such as birthdate, height, weight, eye color, address, etc., that are personal to a specific cardholder but not necessarily unique to that cardholder (i.e., other cardholders might share the same personal data, such as birthdate). Depending on the application, however, personalized data can also include some types of data that are not different from card to card, but that are still provided at the time of card personalization. For example, a state seal that is laser engraved onto a portion of an overlaminate in an identification document, where the laser engraving occurs during the personalization of the card, could in some instances be considered to be "personalized" information.

The terms "laser engraving" and "laser etching" are used interchangeably herein.

The terms "indicium" and indicia as used herein cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, in at least some embodiments of the invention, an indicium formed on any layer in an identification document (e.g., the core layer) may be partially or wholly in the form of a marking visible only under non-visible radiation. Markings comprising, for example, a visible "dummy" image superposed over a non-visible "real" image intended to be machine read may also be used. "Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefm, polysulfone, or polyamide. Laminates can be made using either an amorphous or biaxially oriented polymer as well. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1–20 mils. Lamination of any laminate layer(s) to any other layer of material (e.g., a core layer) can be accomplished using any conventional lamination process, and such processes are well-known to those skilled in the production of articles such as identification documents. Of course, the types and structures of the laminates described herein are provided only by way of example, those skilled in the art will appreciated that many different types of laminates are usable in accordance with the invention.

For example, in ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. Patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the following description will proceed with reference to ID document structures (e.g., TESLIN-core, multi-layered ID documents) and fused polycarbonate structures. It should be appreciated, however, that the present invention is not so limited. Indeed, as those skilled in the art will appreciate, the inventive techniques can be applied to many other structures formed in many different ways to improve their laser engraving characteristics. Generally, the invention has applicability for virtually any product which is to be laser etched or laser engraved, especially articles to which a laminate and/or coating is applied, including articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

In addition, at least one embodiment of the invention relates to virtually any article formed from, laminated with, or at least partially covered by a material that not sufficiently responsive to laser radiation to form a desired indicium (e.g., a grayscale image) thereon, but which is rendered more responsive to laser radiation, at least to a sufficient degree to enable its surface to be marked as desired with a laser beam, by adding the inventive laser enhancing additive to the material itself or to another material (e.g., a coating or laminate) that is substantially adjacent to the material.

B. Laser Etching and Engraving

It is often desirable to mark a portion of a structure, such as a multi-layered structure (including after lamination), such as an ID document, with text, information, graphics, logos, security indicia, security features, marks, images and/or photographs. One goal of producing a secure ID document or card is to be able to manufacture it with materials and/or processes that are not readily available and to endow the card with unique, personalized features that are not easily reproduced by conventional means.

In at least some embodiments of the invention, laser etching helps to provide unique personalized features, in that the finished ID document can be uniquely altered and personalized at the same time. In at least one embodiment, the effect produced by laser etching can be identified easily by a person checking the card, often without special equipment, because the laser etching produces a visual effect and/or a tactile effect. In at least one embodiment of the invention, laser etching can produce a security feature having an optically variable (OV) quality. Laser etching can be produced so that it cannot be easily seen when viewed straight on; a property that has the added benefit of not allowing it to be photocopied. The laser etched feature, however, becomes very apparent in reflected light because the laser etching creates reflecting surfaces that are not parallel to the surface of the document (e.g., the core surface and/or laminate surface). In addition, the laser removes material from the surface of the card and may (optionally) create a pattern that can be felt by touch. This tactile property may be used to further verify the authenticity of the card.

Figure 3:
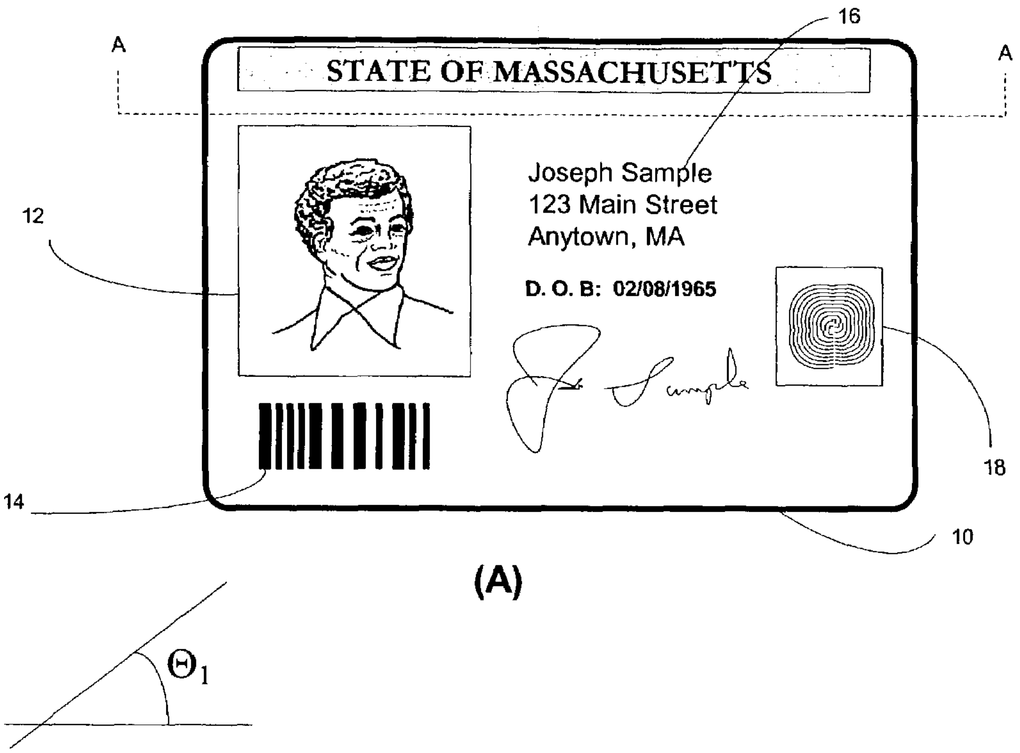
FIGS. 3A and 3B are views of an identification document in accordance with one embodiment of the invention, viewed at first and second angles, respectively.
Figure 3:
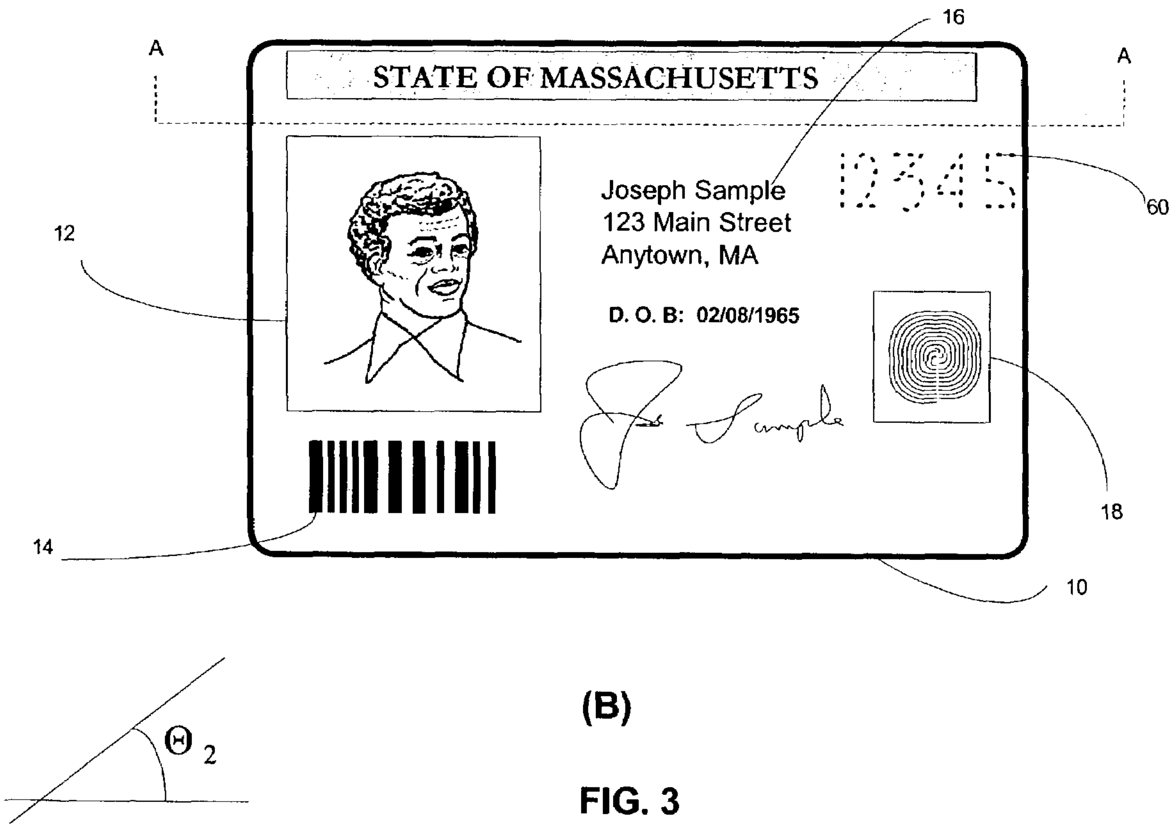

For example, FIGS. 3A and 3B are views of an identification document 10 in accordance with one embodiment of the invention, viewed at first and second angles, respectively. FIG. 3A is a view of the identification document 10 where a viewer is looking directly at the identification document 10, and FIG. 3B is view of the identification document 10 as the document is rotated to an angle of about 45 to 85 degrees as compared to the view of the image in FIG. 3A. Of course, the angle depends on the angle of the light, as well, as will be understood by those skilled in the art.

Figure 4:
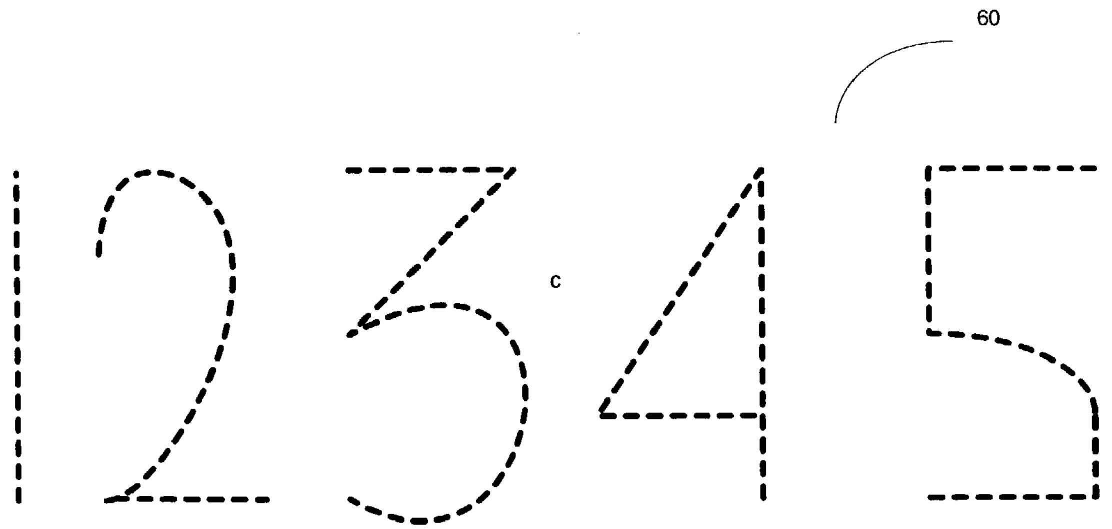
FIG. 4 is an enlarged view of the a security feature of FIG. 3B in accordance with a second embodiment of the first aspect of the invention.

To make the laser etched security feature 70, the ID document 10 (which can be a "finished" document, e.g., all laminates, processes, etc. already applied to the document) is subjected to an ablative laser, such as a solid state $CO_2$ laser, that etches a pattern (e.g., security feature) onto its surface. Of course, other lasers may be suitable employed for such etching. FIG. 4 illustrates the security feature 60 that was laser etched into the surface of identification document 10.

Figure 5:
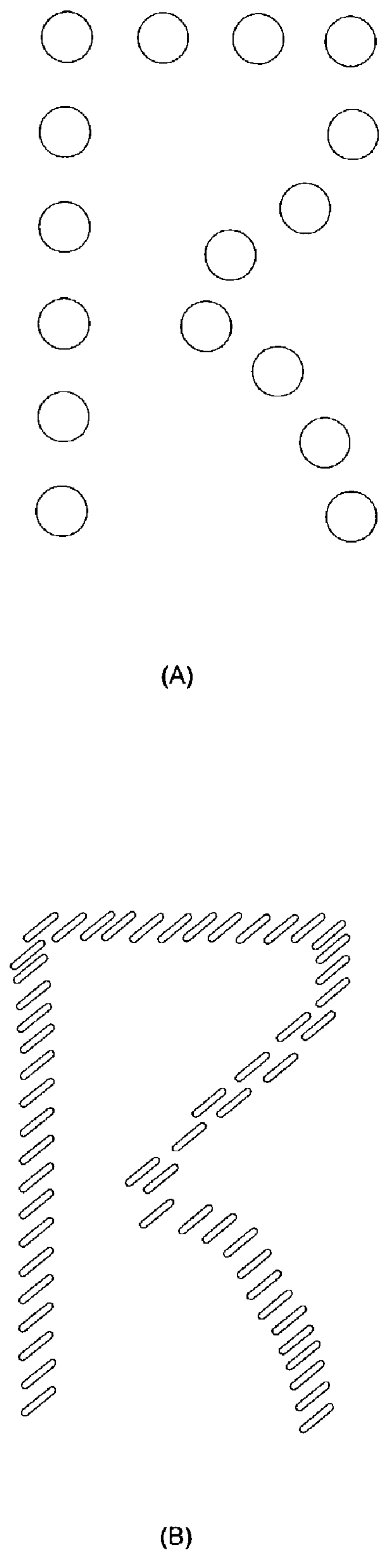
FIGS. 5A and 5B are enlarged views of two illustrative examples of laser etching, in accordance with one embodiment of the invention.
Figure 6:
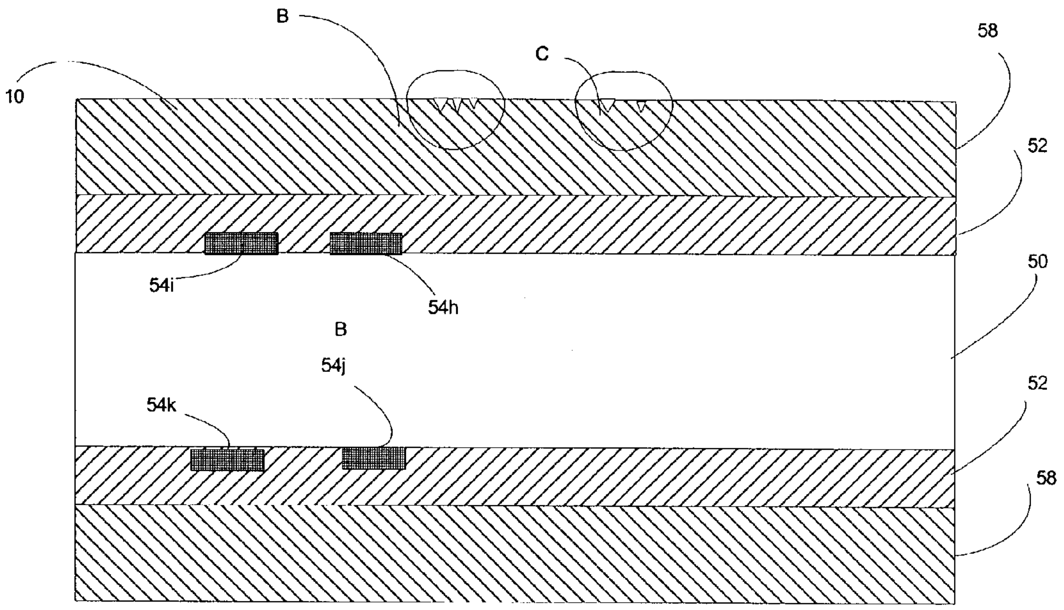
FIG. 6A is an illustrative cross sectional view of the identification document of FIG. 3A taken along the A—A line, in accordance with one embodiment of the invention.
FIG. 6B is a close up view of section B of FIG. 6A.
FIG. 6C is a close up view of section C of FIG. 6A.
Figure 6:
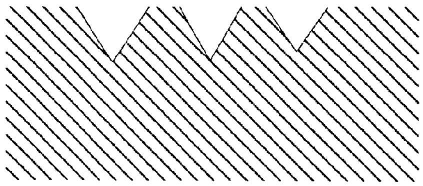
Figure 6:
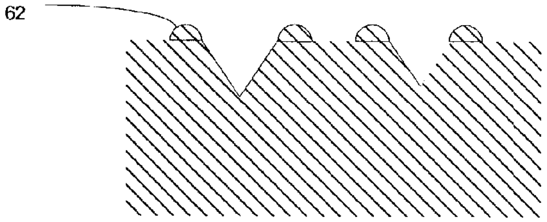

In at least one embodiment, the pattern includes a sequence of small holes, ridges, slits, etc. that form the desired text or design. For example, FIGS. 5A and 5B are two illustrative examples of patterns of holes (FIG. 5*a*) and ridges (FIG. 5B) that a laser can etch into the surface of a substrate (the patterns are shown as they appear when viewed at an appropriate angle. FIG. 6A is illustrative section of the identification document 10 of FIG. 3A–B, showing an exemplary pattern of engraving. FIG. 6A further illustrates information 54*h*–54*l*, formed in a layer 52 that is disposed between an overlaminate 58 and the core layer 50. The information 54*h*–54*l* can be formed by any known means, including, many different types of conventional printing and also laser marking.

As those skilled in the art will appreciate, the laser can be focused at a specific setting to produce holes of a predetermined diameter, depth and spacing. This etching process creates a pattern that can be tactile or non-tactile, but is not readily visible when seen straight on (e.g., the pattern is visible only in low angle reflected light). For example, FIG. 6B is an enlarged view of section B in FIG. 6A, showing a non-tactile pattern.

In an alternate embodiment, our inventive technology is used to create a tactile and/or non-OVD pattern by adjusting the hole depth and area location of the laser engraving. FIG. 6C is an enlarged view of section C in FIG. 6A, showing a tactile pattern with raised edges 62. Even in this alternative implementation, the feature cannot be photocopied.

Our inventive technology can be used to impart either fixed or variable data onto the document's surface. Because the imparted laser pattern lies below the document's surface, there is little or no impact on wear during the document's useful life. Additionally, in at least one embodiment, the laser can be controlled by a computer (or other automated process) and linked to a continuous information and document production control process, to prevent impact on throughput or quality on the overall document production process, since the laser etching speed is typically greater than or equal to the card production speed.

We note that some materials are difficult to laser engrave even with text information. For example, some materials, such as silica filled polyolefin, TESLIN, polycarbonate and fused polycarbonate, polyethylene, polypropylene (PPRO), polystyrene, polyolefin, and copolymers are not very sensitive to laser radiation and thus are not especially conducive to laser engraving. We expressly contemplate that the teachings of at least the following commonly assigned patent applications and their progeny can be used in combination with the teachings of the instant application, to improve the laser engraving process:

Sensitizing Materials For Laser Engraving (Application No. 60/344,677 Inventor: Brian LaBrec);

Laser Engraving Coating System (Application No. 60/344,675 Inventor: Brian LaBrec);

Illustrative examples of ID document materials which can be etched in accordance with at least some embodiments of the invention include (but are not limited to) polyester, polycarbonate (PC), fused polycarbonate, polyvinyl chloride (PVC), polyethylene, thermosets, thermoplastic and thermoplastic resins (including those that foam when heated), engineering thermoplastics (ETP), polyurethane, polyamides, expanded polypropylene (EPP), polypropylene, acrylonitrile butadiene styrene (ABS), ABS/PC and ABS/PC products, high impact polystyrene (HIPS), polyethylene terephthalate (PET), PET-G, PET-F, polybutylene terephthalate (PBS), acetal copolymer (POM), and polyetherimide (PEI), polymer, copolymer, polyester, amorphous polyester, polyolefin, silicon-filled polyolefm, TESLIN, foamed polypropylene film, polystyrene, polyacrylate, poly(4-vinylpyridine, poly(vinyl acetate), polyacrylonitrile, polymeric liquid crystal resin, polysulfone, polyether nitride, and polycaprolactone, as well as virtually any known plastic or polymer. Of course, it will be appreciated that embodiments of the invention have applicability for the laser engraving and/or marking of plastic materials used to make many different articles formed by virtually any known method, including molding and extruding.

It is expressly is contemplated that the inventive laser etching methods taught herein can be used with any layer (e.g., of a laminate) that is affixed (e.g., by adhesive, lamination, chemical reaction, etc.) to virtually any product, to enable the laminate to be laser etched as taught therein. We further believe that at least some of the inventive laser etching methods taught herein have applicability to the manufacture many different articles that can be marked with a security pattern, a tactile pattern, and/or an optically variable indicia, including but not limited to identification documents, identification cards, credit cards, prepaid cards, phone cards, smart cards, contact cards, contactless cards, combination contact-contactless cards, proximity cards (e.g., radio frequency (RFID) cards), electronic components, tags, packaging, containers, building materials, construction materials, plumbing materials, automotive, aerospace, and military products, computers, recording media, labels, tools and tooling, medical devices, consumer products, and toys. Further, we contemplate that entire articles of manufacture could be formed wholly or partially using a material that contains the inventive laser enhancing additive and then laser engraved or marked.

In addition, the laser engraving facilitated by the invention can be used to add a digital watermark to any indicia printed (whether conventionally or by laser engraving) on any layer of the ID document 10. Digital watermarking is a process for modifying physical or electronic media to embed a machine-readable code therein. The media may be modified such that the embedded code is imperceptible or nearly imperceptible to the user, yet may be detected through an automated detection process. The code may be embedded, e.g., in a photograph, text, graphic, image, substrate or laminate texture, and/or a background pattern or tint of the photo-identification document. The code can even be conveyed through ultraviolet or infrared inks and dyes.

Digital watermarking systems typically have two primary components: an encoder that embeds the digital watermark in a host media signal, and a decoder that detects and reads the embedded digital watermark from a signal suspected of containing a digital watermark. The encoder embeds a digital watermark by altering a host media signal. To illustrate, if the host media signal includes a photograph, the digital watermark can be embedded in the photograph, and the embedded photograph can be printed on a photo-identification document. The decoding component analyzes a suspect signal to detect whether a digital watermark is present. In applications where the digital watermark encodes information (e.g., a unique identifier), the decoding component extracts this information from the detected digital watermark.

Several particular digital watermarking techniques have been developed. The reader is presumed to be familiar with the literature in this field. Particular techniques for embedding and detecting imperceptible watermarks in media are detailed, e.g., in Digimarc's co-pending U.S. patent application Ser. No. 09/503,881 and U.S. patent Application Ser. No. 6,122,403. Techniques for embedding digital watermarks in identification documents are even further detailed, e.g., in Digimarc's co-pending U.S. patent application Ser. Nos. 10/094,593, filed Mar. 6, 2002, and Ser. No. 10/170, 223, filed Jun. 10, 2002, co-pending U.S. Provisional Patent application Ser. No. 60/358,321, filed Feb. 19, 2002, and U.S. Pat. No. 5,841,886. Each of the above-mentioned U.S. Patent documents is herein incorporated by reference.

CONCLUDING REMARKS

Depending on the availability of lasers, identification documents manufactured in accordance with the invention can be produced in both over the counter and central issue environments. One example of a printing device that may be usable for at least some over the counter embodiments of the invention is the DATACARD DCL30 Desktop Card Laser Personalization System, available from Datacard Group of Minnetonka, Minn.

The identification document 10 of the invention may be manufactured in any desired size. For example, identification documents can range in size from standard business card size (47.6.times.85.7 mm) up to identification booklet documents (127.times.177.8 mm), and can have thicknesses in the range of from about 0.3 to about 1.3 mm. At least some identification documents produced in accordance with embodiments of the invention conform to all the requirements of ISO 7810, 1985 and will thus be of the CR-80 size, 85.47–85.73 mm wide, 53.92–54.03 mm high and 0.69–0.84 mm thick. The cornes of such CR-80 documents are rounded with a radius of 2.88–3.48 mm.

Further, while some of the examples above are disclosed with specific core components (e.g., TESLIN), we note that our inventive compositions, methods, articles, features, and processes can be applied to other core-based identification documents as well, including those documents manufactured from other materials. For example, where an embodiment has shown polycarbonate or polyester as an example over-laminate, those skilled in the art will appreciate that many other over laminate materials can be used as well.

To provide a comprehensive disclosure without unduly lengthening the specification, applicants herein incorporate by reference each of the patent documents referenced previously, along with U.S. Pat. Nos. 6,022,905, 5,298,922, 5,294,774, 4,652,722, 5,824,715 and 5,633,119, and U.S. patent Ser. Nos. 09/747,735(filed Dec. 22, 2000) and Ser. No. 09/969,200 (filed Oct. 2, 2001).

Having described and illustrated the principles of the technology with reference to specific implementations, it will be recognized that the technology can be implemented in many other, different, forms.

Although certain words, languages, phrases, terminology, and product brands have been used herein to describe the various features of the embodiments of the invention, their use is not intended as limiting. Use of a given word, phrase, language, terminology, or product brand is intended to include all grammatical, literal, scientific, technical, and functional equivalents. The terminology used herein is for the purpose of description and not limitation.

The technology disclosed herein can be used in combination with other technologies. Examples include the technology detailed in the following applications, the disclosures of which are incorporated herein by reference: 09/747,735 (filed Dec. 22, 2000), 09/969,200 (filed Oct. 2, 2001). Also, instead of ID documents, the inventive techniques can be employed with product tags, product packaging, business cards, bags, charts, maps, labels, etc., etc., particularly those items including engraving of an over-laminate structure. The term ID document is broadly defined herein to include these tags, labels, packaging, cards, etc.

The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

Having described and illustrated the principles of the technology with reference to specific implementations, it will be recognized that the technology can be implemented in many other, different, forms.

Although certain words, languages, phrases, terminology, and product brands have been used herein to describe the various features of the embodiments of the invention, their use is not intended as limiting. Use of a given word, phrase, language, terminology, or product brand is intended to include all grammatical, literal, scientific, technical, and functional equivalents. The terminology used herein is for the purpose of description and not limitation.

The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

The invention claimed is:

1. A method of producing a security feature in an identification document comprising:

providing a core including a top surface and a bottom surface;

laminating a first laminate in contact with the top surface; and laminating a second laminate in contact with the bottom surface, the laminated core comprising the identification document, the identification document having a top side and a bottom side respectively corresponding to the core's top and bottom side, the top side having a top surface; and laser etching a pattern into the top surface of the identification document;

wherein the pattern includes visual properties, and wherein the visual properties comprise a characteristic of not being visible when viewed straight on.

2. The method of claim 1, wherein the visual properties comprise a characteristic of resisting image capture.

3. The method of claim 2, where in the image capture is one of photocopying and optical sensor capture.

4. A method of producing a security feature in an identification document comprising:

providing a core including a top surface and a bottom surface;

laminating a first laminate in contact with the top surface; and laminating a second laminate in contact with the bottom surface, the laminated core comprising the identification document, the identification document having a top side and a bottom side respectively corresponding to the core's top and bottom side, the top side having a top surface; and laser etching a pattern into the top surface of the identification document;

wherein the pattern comprises an Optically Variable Device (OVD).

5. An identification document, including a core and at least one outer laminate layer, wherein a top surface of the outer laminate layer is laser-processed to form a pattern, the pattern being essentially not visible when viewed straight-on.

6. The document of claim 5, wherein said laser-processing removes material from the laminate and defines at least one void having a "V" cross section.

7. The document of claim 5, wherein said laser processing also forms a raised feature along at least part of said pattern, said raised feature extending above a nominal top surface level of said outer laminate and providing a tactile effect.

8. The document of claim 5, wherein said laser processing also defines an optically variable device.

9. An identification document, including a core and at least one outer laminate layer, wherein a top surface of the outer laminate layer is laser-processed to remove material therefrom, a void defined by such removing having a "V" cross section.

10. The document of claim 9 wherein said "V" cross section is defined by two intersecting surfaces, neither of which is parallel to the top surface of the outer laminate.

11. The document of claim 9, wherein said laser processing also forms a raised feature, said raised feature extending above a nominal top surface level of said outer laminate and providing a tactile effect.

12. The document of claim 9, wherein said laser processing also defines an optically variable device.

13. An identification document, including a core and at least one outer laminate layer, wherein a top surface of the outer laminate layer is laser-processed in a pattern to remove material therefrom, said laser-processing also forming a raised feature along at least part of said pattern, said raised feature extending above a nominal top surface level of said outer laminate and providing a tactile effect.

14. The document of claim 13, wherein said laser processing also defines an optically variable device.

15. An identification document, including a core and at least one outer laminate layer, the document conveying a portrait image, text information, a signature, and a bar code, wherein a top surface of the outer laminate layer is laser-processed to define an optically variable device.

16. The document of claim 15 wherein said laser processing also defines a pattern that is essentially not visible when viewed straight-on.

17. The document of claim 15, wherein said laser-processing also serves to remove material from the laminate and define a void having a "V" cross section.

18. The document of claim 15, wherein said laser processing also forms a raised feature, said raised feature extending above a nominal top surface level of said outer laminate and providing a tactile effect.

19. An identification document including a core and an output layer of a laminate material, the top surface of the laminate material including a void pattern creating an indicia, the document characterized by raised features along edges of said void pattern, said features comprising foamed laminate material, the raised features extending above a nominal top surface level of the document to provide a tactile effect that aids in verifying the authenticity of the document.

20. A method of producing an identification document, the method including laminating an outer layer to a core layer, and laser-processing the outer layer to form a void pattern therein, the method characterized by foaming said outer layer during said laser processing so as to form a tactile feature adjacent said void pattern, said tactile feature aiding in verifying the authenticity of the document.

* * * * *